US012345155B2

(12) United States Patent
Jiang et al.

(10) Patent No.: US 12,345,155 B2
(45) Date of Patent: Jul. 1, 2025

(54) METHOD FOR DETERMINING WELL WALL COLLAPSE OF SINGLE WELL FOR FRACTURED-VUGGY RESERVOIR

(71) Applicant: Southwest Petroleum University, Chengdu (CN)

(72) Inventors: Xiandong Jiang, Chengdu (CN); Nutao Wang, Chengdu (CN); Chengyang Zhang, Chengdu (CN); Hang Li, Chengdu (CN); Min Wei, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/746,950

(22) Filed: Jun. 18, 2024

(65) Prior Publication Data
US 2024/0376820 A1    Nov. 14, 2024

(30) Foreign Application Priority Data
Jan. 17, 2024   (CN) .......................... 202410070721.3

(51) Int. Cl.
*E21B 47/06*    (2012.01)
*E21B 49/00*    (2006.01)

(52) U.S. Cl.
CPC ............ *E21B 49/006* (2013.01); *E21B 47/06* (2013.01)

(58) Field of Classification Search
CPC ......... E21B 47/06; E21B 47/10; E21B 49/006
See application file for complete search history.

(56) References Cited

U.S. PATENT DOCUMENTS

| 4,420,975 A * | 12/1983 | Nagel | ..................... E21B 47/10 |
| | | | 73/152.05 |
| 7,805,248 B2 * | 9/2010 | Thigpen | .................. E21B 47/10 |
| | | | 702/6 |

(Continued)

FOREIGN PATENT DOCUMENTS

| CN | 105956712 A | 9/2016 |
| CN | 117077419 A | 11/2023 |
| CN | 117807912 B | 7/2024 |

OTHER PUBLICATIONS

First Office Action Issued in Chinese Patent Application No. 202410070721.3 titled Method for Determining Well Wall Collapse of Single Well for Fractured-Vuggy Reservoir, The State Intellectual Property Office of People's Republic of China, Jun. 11, 2024, Beijing, China.

(Continued)

*Primary Examiner* — Kenneth L Thompson
(74) *Attorney, Agent, or Firm* — Silver Legal LLC; Jarrett L. Silver

(57) ABSTRACT

A method for determining well wall collapse of a single well for a fractured-vuggy reservoir is provided. The method includes following steps: S1, treating the single well of the fractured-vuggy reservoir as an isolated reservoir; S2, calculating a water influx rate for the fractured-vuggy reservoir; S3, substituting a formula of the water influx rate into a material balance equation; S4, calculating a change of an oil productivity index without considering the well wall collapse; S5, establishing an optimizing model for obtaining the oil productivity index; S6, calculating the formation pressure at any time in production through step S3; S7, calculating the oil productivity index at any time through the formation pressure, and establishing an optimal objective function; and S8, calculating a difference between the oil productivity index at any time and the theoretically calcu- (Continued)

lated oil productivity index at any time, and determining whether the difference meets an accuracy requirement.

1 Claim, 5 Drawing Sheets

(56) References Cited

U.S. PATENT DOCUMENTS

| | | | | |
|---|---|---|---|---|
| 10,502,858 | B2* | 12/2019 | Zhang | E21B 47/002 |
| 11,111,784 | B2* | 9/2021 | Willberg | E21B 43/12 |
| 11,377,951 | B2* | 7/2022 | Tan | E21B 47/00 |
| 12,104,487 | B2* | 10/2024 | Al-Ofi | G01V 1/50 |
| 2018/0196897 | A1* | 7/2018 | Filippov | G06F 7/00 |
| 2021/0096277 | A1* | 4/2021 | Zaki | E21B 47/06 |
| 2023/0258082 | A1* | 8/2023 | Tan | E21B 47/06 703/10 |
| 2023/0374900 | A1* | 11/2023 | Zeiza | E21B 49/087 |
| 2025/0044473 | A1* | 2/2025 | Gao | E21B 49/00 |

OTHER PUBLICATIONS

Notification to Grant Patent Right for Invention Issued in Chinese Patent Application No. 202410070721.3 titled Method for Determining Well Wall Collapse of Single Well for Fractured-Vuggy Reservoir, The State Intellectual Property Office of People's Republic of China, Jul. 8, 2024, Beijing, China.

Zhang Yongfeng et al., Research and practice of rasonable producing drawdown in long-term dvelopment of horizontal wells in ultra-low permeability type III reservoirs, China Academic Journal Electronic Publishing House, Prepared for presentation at the 2021 International Field Exploration and Development Conference in Qingdao, China, Sep. 16-18, 2021, 7 pages.

Search Report Issued in Chinese Patent Application No. 202410070721.3 titled Method for Determining Well Wall Collapse of Single Well for Fractured-Vuggy Reservoir, The State Intellectual Property Office of People's Republic of China, Jun. 11, 2024, Beijing, China.

Yueli Feng et al., Simulation of the Pressure-Sensitive Seepage Fracture Network in Oil Reservoirs with Multi-Group Fractures, Fluid Dynamics and Materials Processing, vol. 18, Issue 2, Dec. 15, 2021, pp. 395-415, ScienceDirect.

Song Li, Uncertainty evaluation on model predictions of sidewall stability, Petrochemical Industry Technology, an Shiyou University, Aug. 2016, Xi'an 710065,China.

Zheng Songqing et al., Material Balance Equation and Driving Energy Analysis of Fracture-Cave Oil Reserve, Special Oil and Gas Reservoirs, vol. 25, No. 1, Feb. 2018, Sinopec Exploration & Development Research Institute, Beijing 100083, China.

Wang Nutao et al., Abstract of Analysis of the Combined Model for the Production Decline of the Shale-Gas Fractured Horizontal Well, Petroleum Geology and Development in Daqing ,CAS CSCD Peking University core, 2018 No. 5 135-140, 6 pages, Petroleum Geology & Oilfield Development in Daqing.

Zhang Yongfeng et al., Abstract of Research and practice of reasonable producing drawdown in long-term development of horizontal wells in ultra-low permeability type III reservoirs, Proceedings of the 2021 International Conference on Oil and Gas Field Exploration and Development (vol. II)., 2021 International Conference on Oil and Gas Field Exploration and Development, Oct. 20, 2021, Qingdao, Shandong, China.

* cited by examiner

METHOD FOR DETERMINING WELL WALL COLLAPSE OF SINGLE WELL FOR FRACTURED-VUGGY RESERVOIR

CROSS-REFERENCE TO RELATED APPLICATION

This patent application claims the benefit and priority of Chinese Patent Application No. 2024100707213 filed with the China National Intellectual Property Administration on Jan. 17, 2024, the disclosure of which is incorporated by reference herein in its entirety as part of the present application.

TECHNICAL FIELD

The present disclosure relates to the technical field of determining well wall collapse for a fractured-vuggy reservoir, in particular to a method for determining well wall collapse of a single well for a fractured-vuggy reservoir.

BACKGROUND

During the development of fractured-vuggy reservoirs, the fractured-vuggy bodies may or may not be filled with fillers. In the production process, the well wall collapses due to an excessive production differential pressure. How to determine the well wall collapse is particularly important. Production can be better guided and the well wall collapse can be prevented only by knowing the collapse production differential pressure.

There are two main methods to determine well wall collapse. A first method is a core testing method, in which the parameters obtained from core experiments are combined with theoretical analysis to study the changing laws of fabric characteristics, hydraulic properties and strength criteria of rocks. However, the pore structure and the fracture network of a fractured-vuggy reservoir are extremely complex, and the core experiment usually uses smaller cores, which cannot fully represent the larger-scale fractured-vuggy bodies, directly leading to the inability to fully simulate or accurately evaluate the occurrence and evolution of the well wall collapse in the experiment. In addition, the main rock types in the fractured-vuggy reservoir are carbonate rocks, which have different emphases from mudstone core experiments. Such difference needs to be explained by different theoretical models. A second method is a production statistics method, which monitors the well wall performance of production wells, and counts the flowing pressure when the well wall collapses in combination with the monitoring of workover projects, so as to count the production differential pressure when the well wall collapses. This method has great limitations. First, the formation pressure during the collapse must be tested, and the flowing pressure can be calculated by wellbore conduit flow, so as to obtain the critical production differential pressure during the collapse. Therefore, the critical production differential pressure can be used as a guide for production allocation. However, it is very difficult to obtain the formation pressure in the actual production process, and this method has certain difficulties.

1. Core Testing Method

The mechanical parameters of rocks in the well wall to be tested are obtained through core testing. The mechanical parameters include elastic parameters and plastic parameters. The elastic parameters include an elastic modulus, a Poisson's ratio, a compressive strength and an internal friction coefficient of the rocks in an elastic stage. The basic stress parameters of the well wall to be tested are obtained, including a well depth, a pore pressure, an effective stress coefficient, a minimum geostress, etc. Thereafter, according to a certain calculation model, the well wall collapse pressure is obtained.

$$Pc = \frac{3\sigma_H - \sigma_h + (K^2 - 1)\alpha P_p - \sigma_d}{1 + k^2}$$

$$K = ctg(45° - \phi_d/2)$$

where $\sigma_H$ and $\sigma_h$ are horizontal maximum and minimum geostresses, in the unit of MPa; $P_p$ is the formation pressure, in the unit of MPa; $\alpha$ is an effective stress coefficient, in the unit of decimal; and $\phi_d$ is an internal friction angle of rocks considering the influence of rock dilatancy.

This method takes the dilatancy strength as the evaluation criterion of the well stability, and is suitable for the calculation of the collapse pressure of hard and brittle mudstones. The mechanical properties and hydration experiments of the reservoir core need to be studies at the same time. However, it is difficult to core in a fractured-vuggy reservoir. The coring representativeness is weak. Moreover, carbonate rocks in the fractured-vuggy reservoir belong to usually common types of rocks, which do not belong to hard and brittle rocks. Therefore, such method is not suitable for the calculation of the well wall collapse pressure for a fractured-vuggy reservoir.

2. Production Statistics Method

For fractured-vuggy oil wells, water injection huff and puff are often used in the actual production process, and the actual formation shows multiphase flow. It is difficult to apply this method.

SUMMARY

In order to solve the above problems, the present disclosure provide a method for determining well wall collapse of a single well for a fractured-vuggy reservoir. The permeability around the well is inevitably reduced significantly during the well wall collapse, an optimization model of the oil productivity index is established by using a material balance equation and production performance, and the change of the oil productivity index of a single well is obtained by solving the optimization model, so as to find a critical differential pressure during the well wall collapse.

In order to achieve the above purpose, the present disclosure provides a method for determining well wall collapse of a single well for a fractured-vuggy reservoir, which includes the following steps:

S1, treating the single well of the fractured-vuggy reservoir as an isolated reservoir, wherein water influx exists in a production process;

S2, treating a water body for the fractured-vuggy reservoir as a limited water body, and calculating a water influx rate;

S3, substituting a formula of the water influx rate into a material balance equation to obtain a formula of a reservoir formation pressure;

S4, calculating a change of an oil productivity index without considering the well wall collapse;

S5, determining the well wall collapse through the change of the oil productivity index, and establishing an optimizing model for obtaining the oil productivity index;

S6, calculating the formation pressure at any time in production through step S3;

S7, calculating the oil productivity index at any time through the formation pressure at any time in production, and establishing an optimal objective function; and S8, calculating a difference between the obtained oil productivity index at any time and the theoretically calculated oil productivity index at any time, and determining whether the difference meets an accuracy requirement; if so, outputting a target value, otherwise returning to step S6 until the difference meets the accuracy requirement, outputting the change of the oil productivity index, and determining whether the well wall collapses according to the change.

In some embodiments, in step S1, an exploitation of the fractured-vuggy reservoir satisfies a material balance theory:

$$N_p B_o + W_p B_w - W_{inj} B_w = NB_{oi} c_{eff}(p_i - p) + W_e$$

where $N_p$ is cumulative oil production; $W_p$ is cumulative water production; $W_{inj}$ is cumulative water injection; $W_e$ is cumulative water influx; N is a controlled reserve of the single well; $B_o$ is a crude oil volume coefficient; $B_w$ is a formation water volume coefficient; $B_{oi}$ is a crude oil volume coefficient under an original condition; $c_{eff}$ is an effective compressibility coefficient of the reservoir; $p_i$ is an original formation pressure of the reservoir; and p is a reservoir formation pressure.

In some embodiments, in step S2, the water influx rate is calculated by following formula:

$$W_e = V_w c_w (p_i - p)$$

where $V_w$ is a volume of the water body; and $c_w$ is a compressibility coefficient of water.

In some embodiments, in step S3, a formula of the water influx rate is substituted into a material balance equation to obtain a reservoir formation pressure:

$$p = p_i - \frac{N_p B_o + W_p B_w - W_{inj} B_w}{(NB_{oi} c_{eff} + V_w c_w)}$$

where $NB_{oi} c_{eff} + V_w c_w$ will not change, constants can be seen, and assuming that $$a = \frac{1}{NB_{oi} c_{eff} + V_w c_w},$$

the above formula becomes:

$$p = p_i - a(N_p B_o + W_p B_w - W_{inj} B_w)$$

In some embodiments, in step S4, first, a flowing pressure and a production or productivity test data at a time of a highest production are obtained from current production data which are denoted as ($q_{o\ max}$, $p_{wf\ min}$), in which according to the production of the single well:

$$q_{o\,max} = \frac{2\pi k h(p_i - p_{wf min})}{\mu_{oi} B_{oi} \left( \ln \frac{r_e}{r_w} + s \right)}$$

where $$\frac{2\pi k h}{\mu_{oi} B_{oi} \left( \ln \frac{r_e}{r_w} + s \right)}$$

is a constant, which is denoted as:

$$J_{oi} = \frac{2\pi k h}{\mu_{oi} B_{oi} \left( \ln \frac{r_e}{r_w} + s \right)},$$

and during the well wall collapse, a permeability around the well decreases, or a water content increases, the oil productivity index decreases, and a production formula is written as:

$$q_0 = \frac{2\pi k e^{[-\beta(p_i - p)]} k_{ro} h(p - p_{wf})}{\mu_o B_o \left( \ln \frac{r_e}{r_w} + s \right)}$$

or written as $$J_o = \frac{2\pi k e^{[-\beta(p_i - p)]} k_{ro} h}{\mu_o B_o \left( \ln \frac{r_e}{r_w} + s \right)},$$

$J_o$ is rewritten as $$J_o = \frac{2\pi k e^{[-\beta(p_i - p)]} h(1 - f_w)}{\mu_o B_o \left( \ln \frac{r_e}{r_w} + s \right)}$$

a ratio formula of $J_o$ to $J_{oi}$ is obtained:

$$\frac{J_o}{J_{oi}} = \frac{\mu_{oi} B_{oi} e^{[-\beta(p_i - p)]}(1 - f_w)}{\mu_o B_o}$$

the oil productivity index is calculated by the following formula:

$$J_o = \frac{\mu_{oi} B_{oi}}{\mu_o B_o} J_{oi}$$

where $q_{o\ max}$ represents a maximum oil production in the production process, in the unit of m³/d; $p_{wf\ min}$ represents a minimum flow pressure corresponding to $q_{o\ max}$, in the unit of MPa (maximal production and minimum flow pressure); $q_o$ represents the oil production in the production process, in the unit of m³/d; $p_{wf}$ represents a flow pressure corresponding to $q_o$, in the unit of MPa (maximal production and minimum flow pressure); β represents a stress sensitivity index corresponding to collapse, in the unit of 1/MPa; $k_{ro}$ represents a relative permeability of an oil phase, which is dimensionless; $\mu_o$ represents a viscosity of oil corresponding to the formation pressure p, in the unit of mPa·s; $\mu_{oi}$ represents a viscosity of oil corresponding to an initial formation pressure $p_i$, in the unit of mPa·s; and e represents an exponential function.

In some embodiments, in step S5, $J_o$ at any time is obtained by obtaining the formation pressure, and the well wall collapse is determined through a change of $J_o$.

In some embodiments, in step S7, the oil productivity index at any time is calculated through the formation pressure at any time in production:

$$J_o^* = \frac{q_o}{p - p_{wf}}$$

the theoretically calculated oil productivity index at any time is obtained from the ratio formula of $J_o$ to $J_{oi}$:

$$J_o = \frac{\mu_{oi} B_{oi} e^{[-\beta(p_i - p)]} (1 - f_w)}{\mu_o B_o} J_{oi}$$

at this time, the optimal objective function is established:

$$M = \min \sum_{i=1}^{n} (J_o^* - J_o)^2.$$

The present disclosure has the following beneficial effects.

According to the present disclosure, the permeability around the well is inevitably reduced significantly during the well wall collapse, or the pollution coefficient around the well will change, so that the oil productivity index of the production well will be decreased more rapidly. The critical differential pressure of the well wall collapse can be determined by finding the production differential pressure when the oil productivity index suddenly changes, so that the complicated test steps can be avoided, the cost is saved, and the deficiency of the calculation of the pressure of well wall collapse for the fractured-vuggy oil reservoir is made up.

The technical scheme of the present disclosure will be further described in detail through the accompanying drawings and embodiments.

DETAILED DESCRIPTION OF THE EMBODIMENTS

Figure 1:
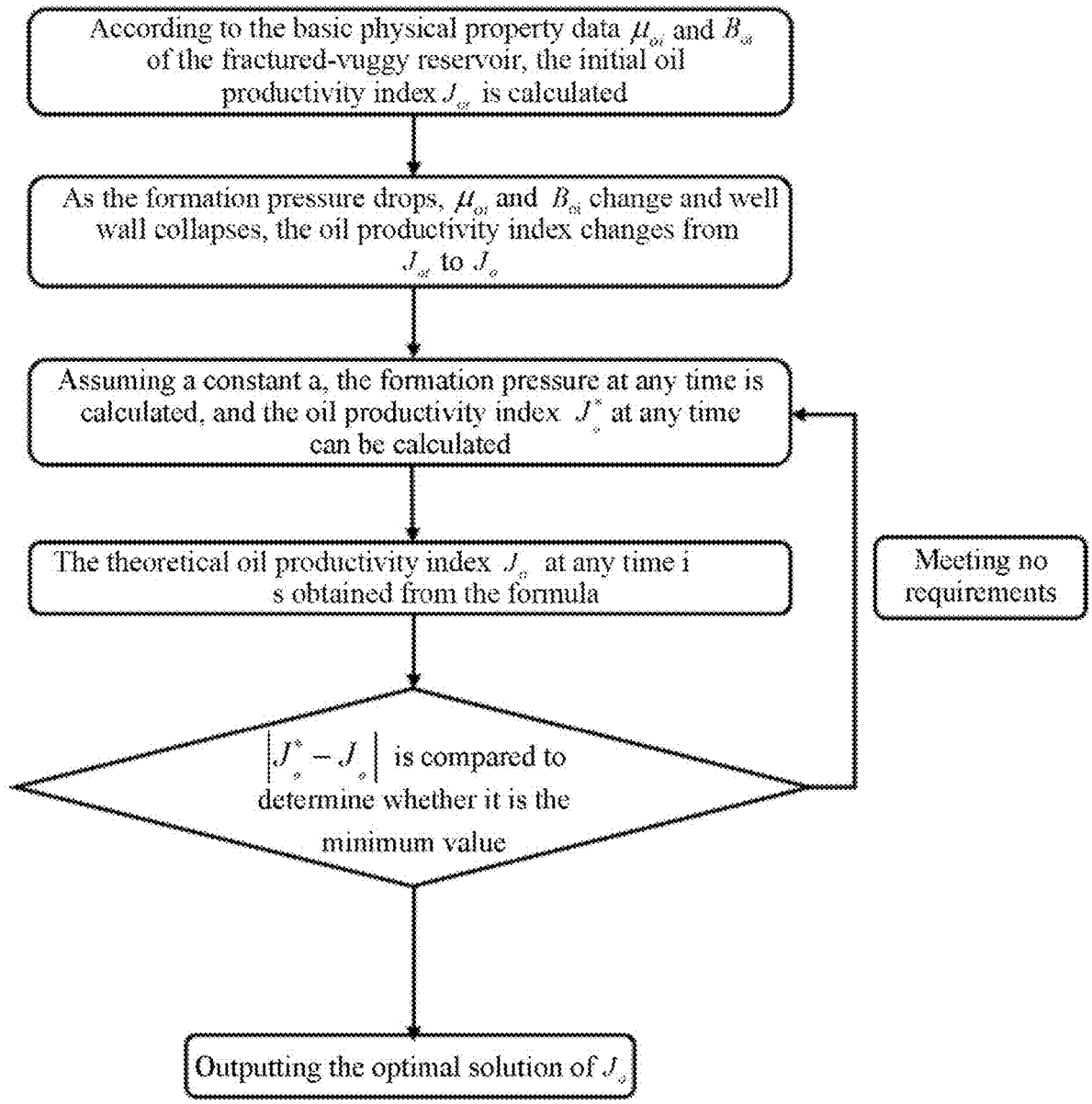
FIG. 1 is a flow chart of a solving method according to an embodiment of the present disclosure.

In order to make the purpose, technical schemes and advantages disclosed in the embodiment of the present disclosure more clearly understood, the embodiments of the present disclosure will be further described in detail in combination with the accompanying drawings and embodiments. It should be understood that the specific embodiments described here are only used to explain the embodiments of the present disclosure, rather than limit the embodiments of the present disclosure. Based on the embodiments in the present disclosure, all other embodiments obtained by those ordinarily skilled in the art without creative work belong to the scope of protection of the present disclosure. Examples of the embodiments are illustrated in the accompanying drawings, in which the same or similar reference numerals indicate the same or similar elements or elements having the same or similar functions throughout.

It should be noted that the terms "including" and "having" and any variations thereof are intended to cover non-exclusive inclusion. For example, a process, method, system, product or server including a series of steps or units is not necessarily limited to those steps or units explicitly listed, but may include other steps or units not explicitly listed or inherent to these processes, methods, products or devices.

Similar numbers and letters indicate similar items in the following drawings. Therefore, once an item is defined in one drawing, the item does not need to be further defined and explained in subsequent drawings.

In the description of the present disclosure, it should be noted that the oriented or positional relationship indicated by the terms "upper", "lower", "inner" and "outer" is based on the oriented or positional relationship shown in the accompanying drawings, or is the oriented or positional relationship that the product of the present disclosure is usually placed in use, which is only used for the convenience of describing the present disclosure and simplifying the description, rather than indicate or imply that the referred device or element must have a specific orientation, be constructed and operated in a specific orientation. Therefore, the oriented or positional relationship cannot be construed as a limitation of the present disclosure.

In the description of the present disclosure, it should also be noted that unless otherwise specified and defined, the terms "provide", "install" and "connect" should be broadly understood. For example, there can be fixed connection, detachable connection or integrated connection; there can be mechanical connection or electrical connection; there can be direct connection or indirect connection through an intermediate medium, and there can be internal communication between two elements. For those ordinarily skilled in the art, the specific meanings of the above terms in the present disclosure can be understood in specific situations.

As shown in FIG. 1, the method for determining well wall collapse of the single well for the fractured-vuggy reservoir according to the present disclosure includes the following steps S1 to S8.

In step S1, the single well for the fractured-vuggy reservoir is treated as a small isolated reservoir, which may be connected with finite or infinite water bodies. Therefore, water influx may exist in the production process. An exploitation of any reservoir satisfies a material balance theory:

$$N_p B_o + W_p B_w - W_{inj} B_w = N B_{oi} c_{eff}(p_i - p) + W_e$$

where $N_p$ is cumulative oil production, in the unit of ten thousand cubic meters; $W_p$ is cumulative water production, in the unit of ten thousand cubic meters; $W_{inj}$ is cumulative water injection, in the unit of ten thousand cubic meters; $W_e$ is cumulative water influx, in the unit of ten thousand cubic meters; N is a controlled reserve of the single well, in the unit of ten thousand cubic meters; $B_o$ is a crude oil volume coefficient, which is dimensionless; $B_w$ is a formation water volume coefficient, which is dimensionless; $B_{oi}$ is a crude oil volume coefficient under an original condition, which is dimensionless; $c_{eff}$ is an effective compressibility coefficient of the reservoir, MPa$^{-1}$; $p_i$ is an original formation pressure of the reservoir, MPa; and P is a reservoir formation pressure, MPa.

In step S2, a water body for the fractured-vuggy reservoir can be treated as a limited water body, so that a water influx rate can be calculated by a following formula:

$$W_e = V_w c_w (p_i - p)$$

where $V_w$ is a volume of the water body, in the unit of ten thousand cubic meters; and $c_w$ is a compressibility coefficient of water, in the unit of MPa$^{-1}$.

In step S3, a formula of the water influx rate is substituted into a material balance equation to obtain:

$$p = p_i - \frac{N_p B_o + W_p B_w - W_{inj} B_w}{(N B_{oi} c_{eff} + V_w c_w)}$$

where $N B_{oi} c_{eff} + V_w c_w$ does not change and can be deemed as a constant, and assuming that $$a = \frac{1}{N B_{oi} c_{eff} + V_w c_w},$$

the above formula becomes:

$$p = p_i - a(N_p B_o + W_p B_w - W_{inj} B_w)$$

In step S4, a change of an oil productivity index is found without considering the well wall collapse. First, a flowing pressure and a production or productivity test data at a time of a highest production are obtained from current production data which are denoted as ($q_{o\ max}$, $p_{wf\ min}$) in which according to the production of the single well:

$$q_{omax} = \frac{2\pi k h (p_i - p_{wf\ min})}{\mu_{oi} B_{oi} \left( \ln \frac{r_e}{r_w} + s \right)}.$$

According to the formula, when the production reaches the maximum, the flowing pressure is the minimum. At this time, the production differential pressure should be the highest, because the formation pressure has not decreased in the initial state.

$$\frac{2\pi k h}{\mu_{oi} B_{oi} \left( \ln \frac{r_e}{r_w} + s \right)}$$

is a constant, which is denoted as:

$$J_{oi} = \frac{2\pi k h}{\mu_{oi} B_{oi} \left( \ln \frac{r_e}{r_w} + s \right)}.$$

During the well wall collapse, a permeability around the well decreases, or a water content increases, so that the oil productivity index decreases, and a production formula is written as:

$$q_o = \frac{2\pi k e^{[-\beta(p_i - p)]} k_{ro} h (p - p_{wf})}{\mu_o B_o \left( \ln \frac{r_e}{r_w} + s \right)}$$

or written as $$J_o = \frac{2\pi k e^{[-\beta(p_i - p)]} k_{ro} h}{\mu_o B_o \left( \ln \frac{r_e}{r_w} + s \right)}.$$

The initial change from $J_{oi}$ to $J_o$ is mainly resulted from two parts. One part is the change of physical parameters $\mu_o$, $B_o$ of crude oil due to the decrease of the formation pressure, and is acquired from physical parameters of the crude oil test. The other part is the well wall collapse and the water content. Therefore, $J_o$ is rewritten as $$J_o = \frac{2\pi k e^{[-\beta(p_i - p)]} h (1 - f_w)}{\mu_o B_o \left( \ln \frac{r_e}{r_w} + s \right)}$$

Further, a ratio formula of $J_o$ to $J_{oi}$ can be obtained:

$$\frac{J_o}{J_{oi}} = \frac{\mu_{oi} B_{oi} e^{[-\beta(p_i - p)]} (1 - f_w)}{\mu_o B_o}.$$

If the influence from the well wall collapse and the stress sensitive factors is not taken into account, the oil productivity index is calculated by the following formula, that is:

$$J_o = \frac{\mu_{oi}B_{oi}}{\mu_o B_o}J_{oi}$$

where $q_{o\ max}$ represents a maximum oil production in the production process, in the unit of m³/d; $p_{wf\ min}$ represents a minimum flow pressure corresponding to $q_{o\ max}$, in the unit of MPa (maximal production and minimum flow pressure); $q_o$ represents the oil production in the production process, in the unit of m³/d; $p_{wf}$ represents a flow pressure corresponding to $q_o$, in the unit of MPa (maximal production and minimum flow pressure); β represents a stress sensitivity index corresponding to collapse, in the unit of 1/MPa; $k_{ro}$ represents a relative permeability of an oil phase, which is dimensionless; $\mu_o$ represents a viscosity of oil corresponding to the formation pressure p, in the unit of mPa·s; $\mu_{oi}$ represents a viscosity of oil corresponding to an initial formation pressure $p_i$, in the unit of mPa·s; and e represents an exponential function.

The change of an oil productivity index changes with the change of fluid properties resulted from the change of the formation pressure. With the decrease of the formation pressure, the oil productivity index increases slightly. On the contrary, if the oil productivity index decreases, it shows that the oil layer around the well wall has been damaged to varying degrees, resulting in the decrease of the permeability. The main damage to the fractured-vuggy reservoir is the well wall collapse.

In step S5, it can be known from the ratio of $J_o$ to $J_{oi}$ that $J_o$ at any time can be obtained as long as the formation pressure is obtained, and the well wall collapse is determined through a change of $J_o$. An optimizing model for obtaining $J_o$ is established below.

In step S6, assuming a constant a, the formation pressure at any time of production is calculated by the formula in S3.

In step S7, the oil productivity index at any time can be calculated through the formation pressure, that is, $$J_o^* = \frac{q_o}{p - p_{wf}};$$

and the theoretically calculated oil productivity index at any time is obtained from the ratio formula of $J_o$ and $$J_o = \frac{\mu_{oi}B_{oi}e^{[-\beta(p_i-p)]}(1-f_w)}{\mu_o B_o}J_{oi}$$

At this time, the optimal objective function is established:

$$M = \min\sum_{i=1}^{n}(J_o^* - J_o)^2$$

Figure 2:
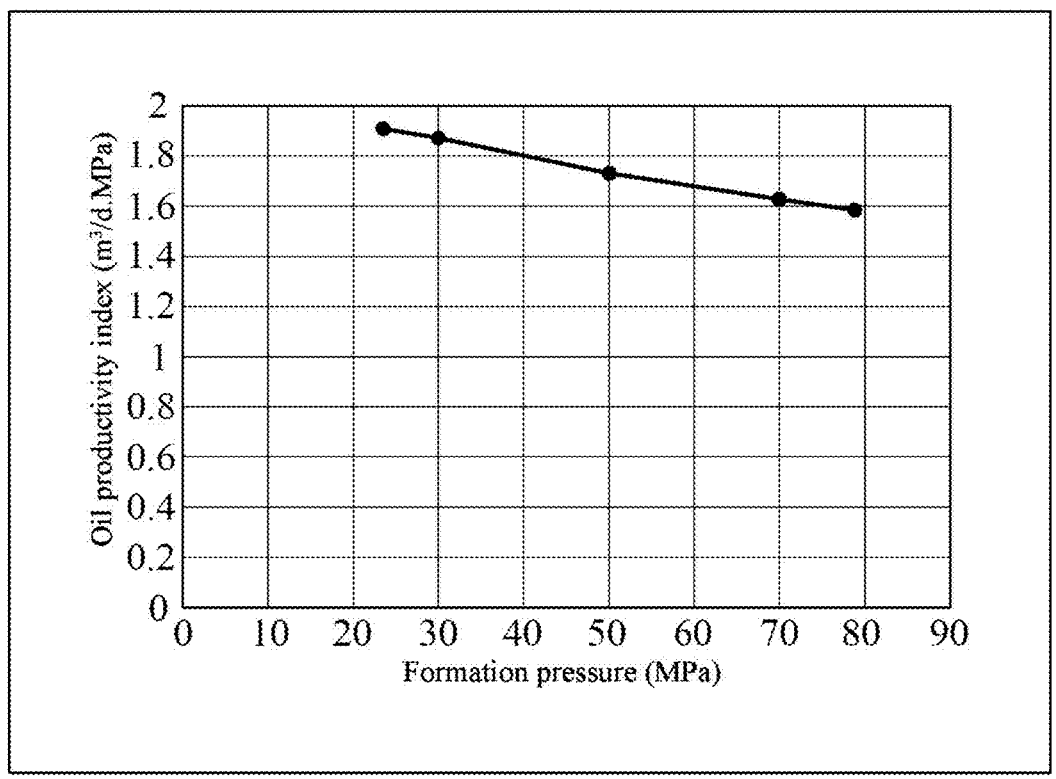
FIG. 2 is a schematic diagram of a variation of an oil productivity index according to the embodiment of the present disclosure.

In step S8, as shown in FIG. 2, a difference between the obtained oil productivity index at any time and the theoretically calculated oil productivity index at any time is calculated, and it is determined whether the difference meets an accuracy requirement; if so, a target value is output, otherwise the process returns to step S6 until the difference meets the accuracy requirement, the change of the oil productivity index is output, and it is determined whether the well wall collapses according to the change.

A well in an oil reservoir is taken as an example.

Figure 3:
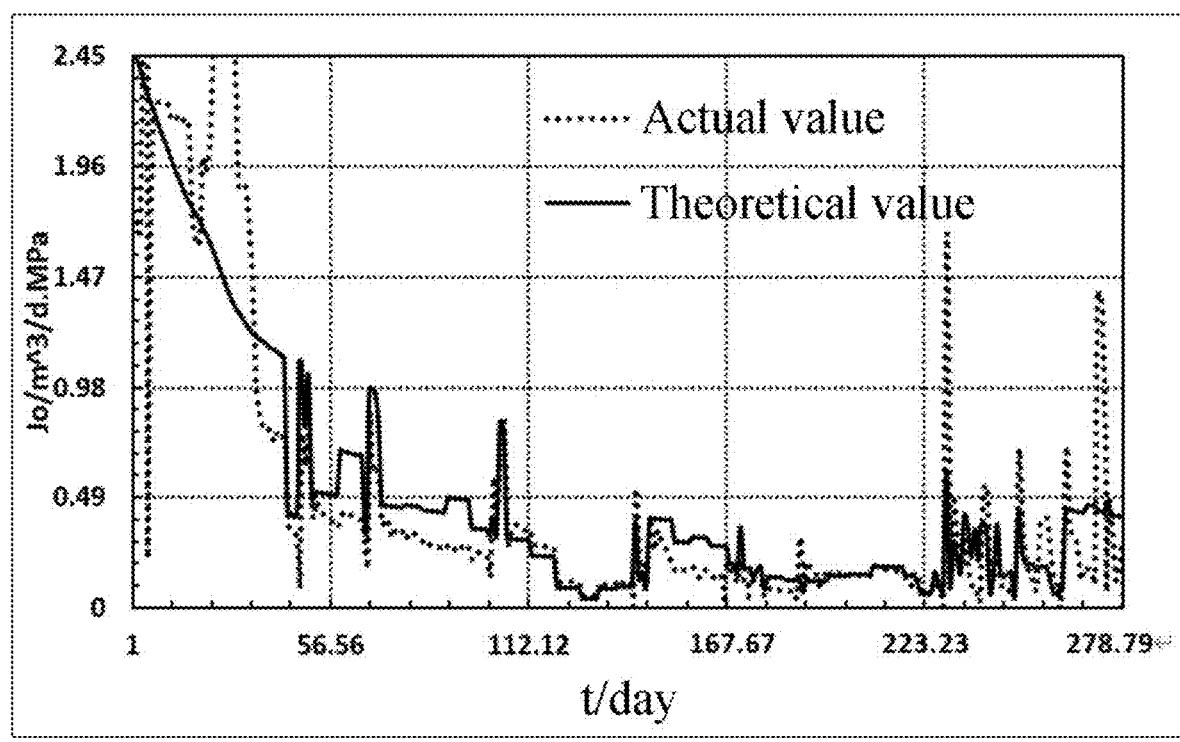
FIG. 3 is a fitting graph of an oil productivity index of No. 1 well according to the embodiment of the present disclosure.
Figure 4:
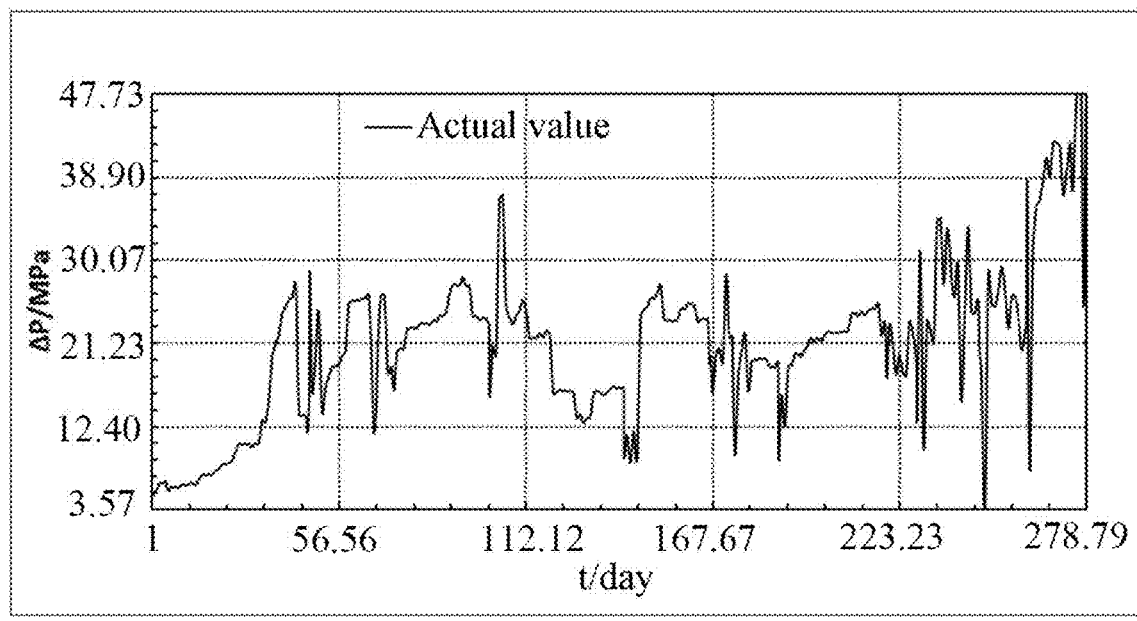
FIG. 4 is a graph of a production differential pressure of No. 1 well according to the embodiment of the present disclosure.
Figure 5:
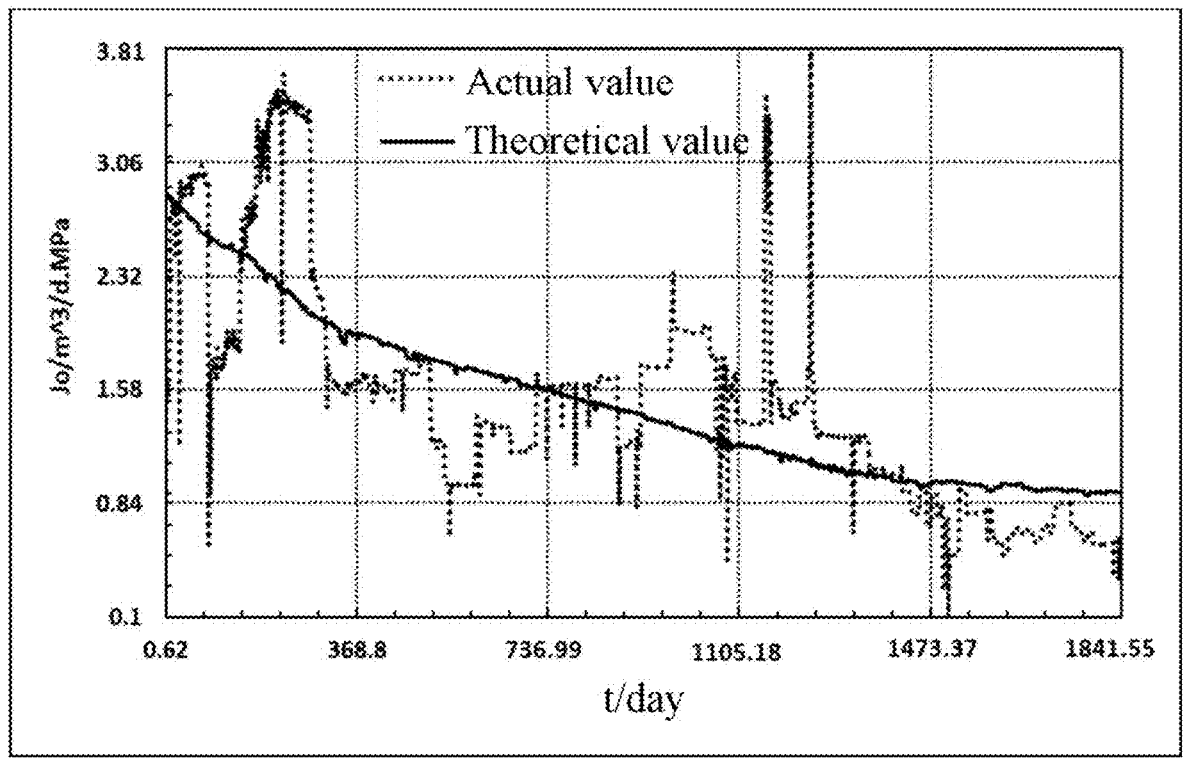
FIG. 5 is a fitting graph of an oil productivity index of No. 2 well according to the embodiment of the present disclosure.
Figure 6:
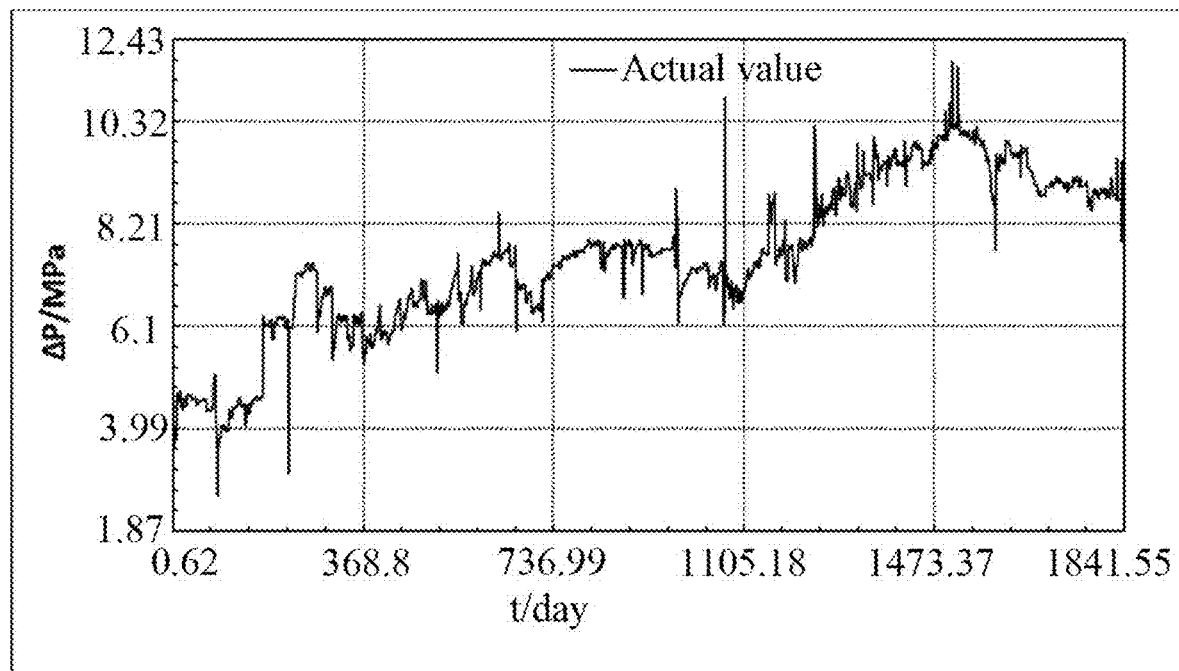
FIG. 6 is a graph of a production differential pressure of No. 2 well according to the embodiment of the present disclosure.

As shown in FIG. 3 and FIG. 4, it can be seen from the fitting graph of the oil productivity index of No. 1 well that in the early stage, the oil productivity index shows a cliff-like downward trend. Such drastic change of the oil productivity index is resulted from the typical well wall collapse. From this oil productivity index during the well wall collapse, the formation pressure during the collapse can be calculated inversely by the above method of determining the well wall collapse. The same holds for No. 2 well, as shown in FIG. 5 and FIG. 6. In addition, due to the change of the oil productivity index in the production process, it can be reasonably inferred that the fractured-vuggy body of No. 1 underground reservoir is in the under-filled or half-filled state.

By using this method, the well with known well wall collapse is verified. The production differential pressure at the specific collapse point is found out, and then the formation pressure during the collapse is obtained, which has certain guiding significance for the subsequent guidance of the reasonable formation pressure maintenance degree of this well. No. 1 well and No. 2 well collapse in the early stage of production. The corresponding production differential pressure of No. 1 well is 12.4 MPa, and the pressure maintenance degree is 91.71%. The corresponding production differential pressure of No. 2 well is 4.89 MPa, and the pressure maintenance degree is 97.08%. The following are calculation parameter tables 1 and 2 of well wall collapse of No. 1 well and No. 2 well.

TABLE 1 calculation parameter table of well wall collapse of No. 1 well

| Oil productivity index (m³/d · MPa) | geological reserves 10⁴m³ | production differential pressure during the collapse (MPa) | formation pressure during the collapse (MPa) | Formation pressure maintenance degree during the collapse |
|---|---|---|---|---|
| 2.139433 | 127.5756 | 12.40 | 81.8478 | 91.71% |

TABLE 2 calculation parameter table of well wall collapse of No. 2 well

| Oil productivity index (m³/d · MPa) | geological reserves 10⁴m³ | production differential pressure during the collapse (MPa) | formation pressure during the collapse (MPa) | Formation pressure maintenance degree during the collapse |
|---|---|---|---|---|
| 5.5567 | 839.22 | 13.25 | 83.31 | 94.03% |

By comparing with the data brought back from the field, it is determined from the oil productivity index that the well wall collapse is in good agreement with the actual situation in the field, which proves that this method has better applicability in determining the well wall collapse for fractured-vuggy carbonate reservoirs, and the change of the reservoir permeability resulted from the well wall collapse can better reflect the change of the formation performance.

There are many factors that affect the oil productivity index. For example, fracture closure resulted from stress sensitivity or fluid property change resulted from pressure drop will cause the oil productivity index to decrease. In conventional edge water reservoirs, if the well wall does not collapse, the oil productivity index will increase slightly.

Figure 7:
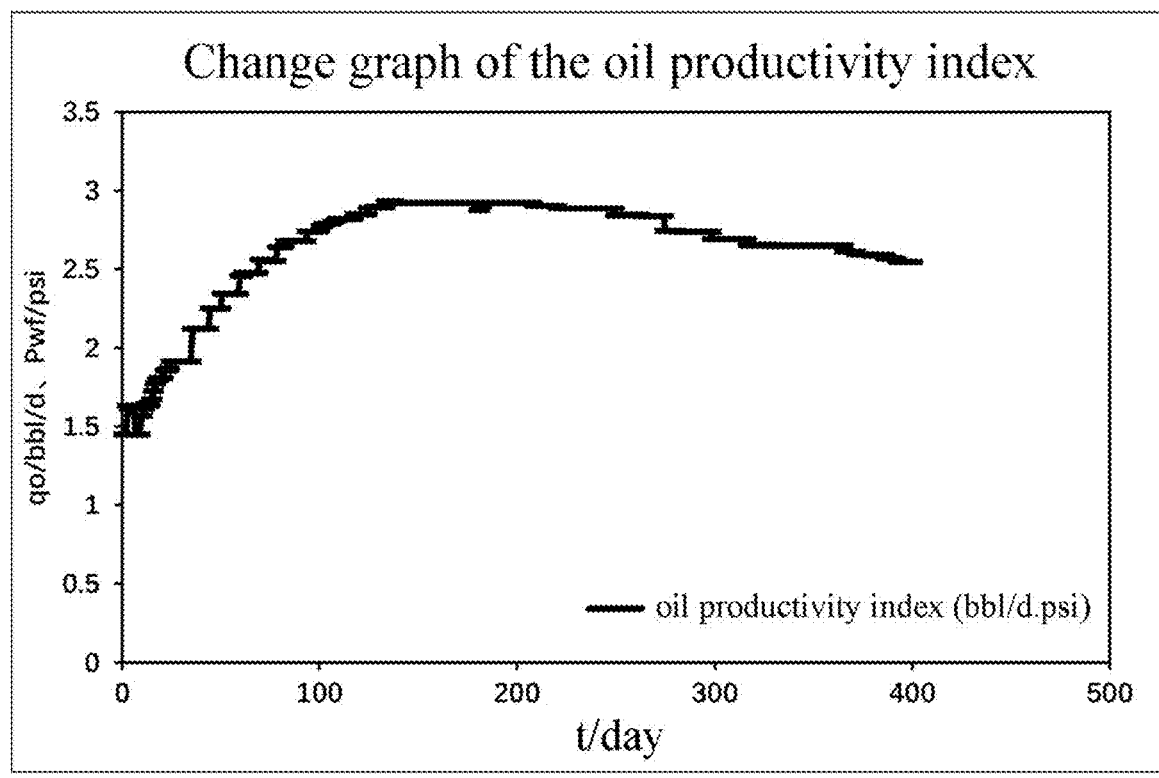
FIG. 7 is a graph of an oil productivity index of an edge water reservoir according to an embodiment of the present disclosure.

Only the increase of water content will cause the oil productivity index to slowly decrease, which is a normal fluctuation, as shown in FIG. 7. However, in actual production, the oil productivity index plummets by 30% and does not recover in a short time, which can be considered to be resulted from the well wall collapse.

Therefore, the present disclosure uses the method for determining well wall collapse of the single well for the fractured-vuggy reservoir. According to the method, an optimization model of the oil productivity index is established by using a material balance equation and production performance, and the change of the oil productivity index of a single well is obtained by solving the optimization model, so as to find a critical differential pressure during the well wall collapse.

Figure 8:
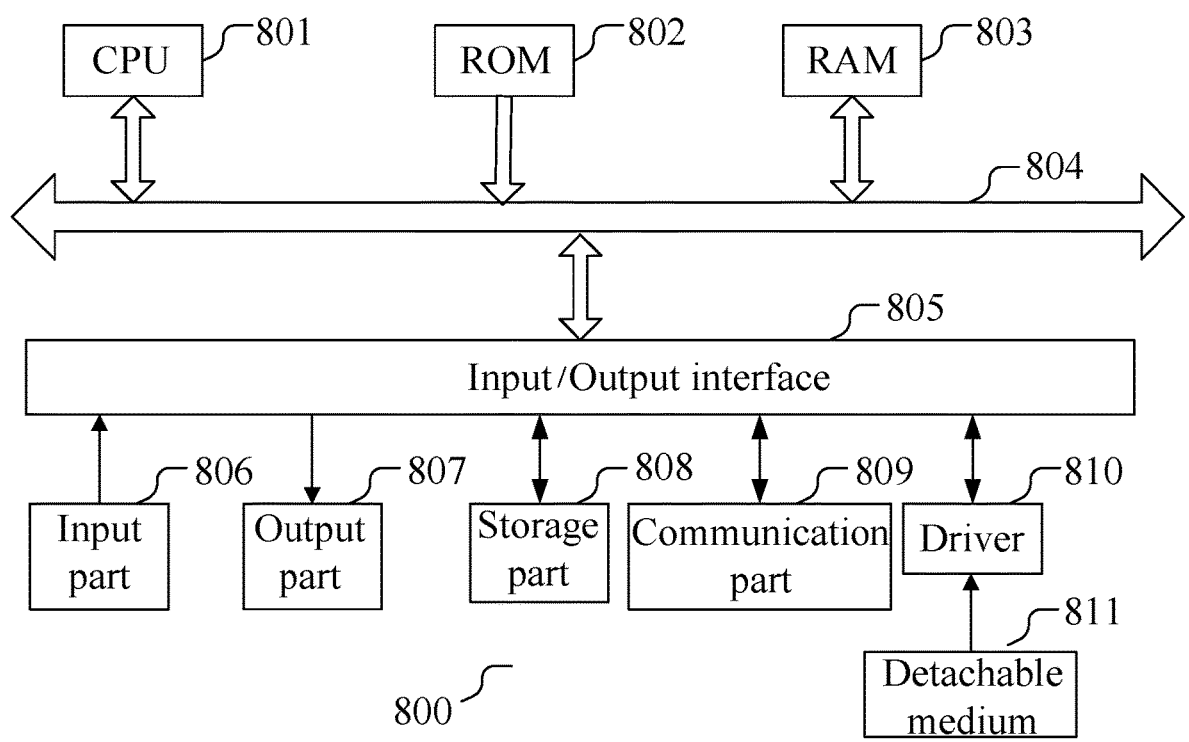
FIG. 8 shows a schematic block diagram of a computer that can be used for implementing the method and the system according to the embodiments of the present disclosure.

FIG. 8 shows a schematic block diagram of a computer 800 that can be used for implementing the method and the system according to the embodiments of the present disclosure.

In FIG. 8, a central processing unit (CPU) 801 executes various processing according to a program stored in a read-only memory (ROM) 802 or a program loaded from a storage part 808 to a random access memory (RAM) 803. In the RAM 803, data needed at the time of execution of various processing and the like by the CPU 801 is also stored according to requirements. The CPU 801, the ROM 802 and the RAM 803 are connected to each other via a bus 804. An input/output interface 805 is also connected to the bus 804.

The following components are connected to the input/output interface 805: an input part 806 (including a keyboard, a mouse and the like); and output part 807 (including a display, such as a Cathode Ray Tube (CRT), a Liquid Crystal Display (LCD) and the like, as well as a loudspeaker and the like); the storage part 808 (including a hard disc and the like); and a communication part 809 (including a network interface card such as an LAN card, a modem and so on). The communication part 809 performs communication processing via a network such as the Internet. According to requirements, a driver 810 may also be connected to the input/output interface 805. A detachable medium 811 such as a magnetic disc, an optical disc, a magnetic optical disc, a semiconductor memory and the like may be installed on the driver 810 according to requirements, such that a computer program read therefrom is installed in the storage part 808 according to requirements.

In the case of carrying out the foregoing series of processing by software, programs constituting the software are installed from a network such as the Internet or a storage medium such as the detachable medium 811.

Those skilled in the art should appreciate that such a storage medium is not limited to the detachable medium 811 storing therein a program and distributed separately from the apparatus to provide the program to a user as shown in FIG. 8. Examples of the detachable medium 811 include a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Or, the storage medium may be hard discs and the like included in the ROM 802 and the storage part 808 in which programs are stored, and are distributed concurrently with the apparatus including them to users.

The present disclosure further proposes a program product storing therein a machine-readable instruction code that, when read and executed by a machine, can implement the aforesaid method according to the embodiment of the present disclosure.

Correspondingly, a storage medium for carrying the program product storing therein the machine-readable instruction code is also included in the disclosure of the present disclosure. The storage medium includes but is not limited to a floppy disc, an optical disc, a magnetic optical disc, a memory card, a memory stick and the like.

Finally, it should be explained that the above embodiments are only used to illustrate the technical scheme of the present disclosure, rather than limit the technical scheme. Although the present disclosure has been described in detail with reference to the preferred embodiments, those skilled in the art should understand that the technical scheme of the present disclosure can be still modified or substituted equivalently, and these modifications or equivalent substitutions cannot make the modified technical scheme deviate from the spirit and scope of the technical scheme of the present disclosure.

What is claimed is:

1. A method for determining well wall collapse of a single well for a fractured-vuggy reservoir, comprising:
   S1, treating the single well of the fractured-vuggy reservoir as an isolated reservoir, wherein water influx exists in a production process;
   S2, treating a water body for the fractured-vuggy reservoir as a limited water body, and calculating a water influx rate;
   S3, substituting a formula of the water influx rate into a material balance equation to obtain a formula for a formation pressure of the reservoir;
   S4, calculating a change of an oil productivity index without considering the well wall collapse;
   S5, determining the well wall collapse through the change of the oil productivity index, and establishing an optimizing model for obtaining the oil productivity index;
   S6, calculating the formation pressure at any time in production through step S3;
   S7, calculating the oil productivity index at any time through the formation pressure at any time in production, and establishing an optimal objective function; and
   S8, calculating a difference between the obtained oil productivity index at any time and the theoretically calculated oil productivity index at any time, and determining whether the difference meets an accuracy requirement; if so, outputting a target value; otherwise returning to step S6 until the difference meets the accuracy requirement, outputting the change of the oil productivity index, and determining whether the well wall collapses according to the change,
   wherein in step S1, an exploitation of the fractured-vuggy reservoir satisfies a material balance theory:

$$N_p B_o + W_p B_w - W_{inj} B_w = NB_{oi} c_{eff}(p_i - p) + W_e$$

where $N_p$ is cumulative oil production; $W_p$ is cumulative water production; $W_{inj}$ is cumulative water injection; $W_e$ is cumulative water influx; N is a controlled reserve of the single well; $B_o$ is a crude oil volume coefficient; $B_w$ is a formation water volume coefficient; $B_{oi}$ is a crude oil volume coefficient under an original condition; $c_{eff}$ is an effective compressibility coefficient of the reservoir; $p_i$ is an original formation pressure of the reservoir; and p is a formation pressure of the reservoir;

wherein in step S2, the water influx rate is calculated by following formula:

$$W_e = V_w c_w (p_i - p)$$

where $V_w$ is a volume of the water body; and $c_w$ is a compressibility coefficient of water;

wherein in step S3, a formula of the water influx rate is substituted into a material balance equation to obtain a formation pressure of the reservoir:

$$p = p_i - \frac{N_p B_o + W_p B_w - W_{inj} B_w}{(NB_{oi} c_{eff} + V_w c_w)}.$$

wherein in step S4, first, a flowing pressure and a production or productivity test data at a time of a highest production are obtained from current production data which are denoted as ($q_{omax}$, $p_{wfmin}$) in which according to the production of the single well:

$$q_{o max} = \frac{2\pi k h (p_i - p_{wf\,min})}{\mu_{oi} B_{oi} \left( \ln \frac{r_e}{r_w} + s \right)}$$

where $$\frac{2\pi k h}{\mu_{oi} B_{oi} \left( \ln \frac{r_e}{r_w} + s \right)}$$

is a constant, which is denoted as:

$$J_{oi} = \frac{2\pi k h}{\mu_{oi} B_{oi} \left( \ln \frac{r_e}{r_w} + s \right)},$$

and during the well wall collapse, a permeability around the well decreases, or a water content increases, the oil productivity index decreases, and a production formula is written as:

$$q_o = \frac{2\pi k e^{[-\beta(p_i - p)]} k_{ro} h (p - p_{wf})}{\mu_o B_o \left( \ln \frac{r_e}{r_w} + s \right)}$$

or written as $$J_o = \frac{2\pi k e^{[-\beta(p_i - p)]} k_{ro} h}{\mu_o B_o \left( \ln \frac{r_e}{r_w} + s \right)},$$

$J_o$ is rewritten as $$J_o = \frac{2\pi k e^{[-\beta(p_i - p)]} h (1 - f_w)}{\mu_o B_o \left( \ln \frac{r_e}{r_w} + s \right)}$$

a ratio formula of $J_o$ to $J_{oi}$ is obtained:

$$\frac{J_o}{J_{oi}} = \frac{\mu_{oi} B_{oi} e^{[-\beta(p_i - p)]} (1 - f_w)}{\mu_o B_o}$$

the oil productivity index is calculated by the following formula:

$$J_o = \frac{\mu_{oi} B_{oi}}{\mu_o B_o} J_{oi}$$

where $q_{omax}$ represents a maximum oil production in the production process; $p_{wfmin}$ represents a minimum flow pressure corresponding to $q_{omax}$; $q_o$ represents the oil production in the production process; $p_{wf}$ represents a flow pressure corresponding to $q_o$; $\beta$ represents a stress sensitivity index corresponding to collapse; $k_{ro}$ represents a relative permeability of an oil phase; $\mu_o$ represents a viscosity of oil corresponding to the formation pressure p; $\mu_{oi}$ represents a viscosity of oil corresponding to an initial formation pressure $p_i$; and e represents an exponential function;

wherein in step S5, $J_o$ at any time is obtained by obtaining the formation pressure, and the well wall collapse is determined through a change of $J_o$; and wherein in step S7, the oil productivity index at any time is calculated through the formation pressure at any time in production:

$$J_o^* = \frac{q_o}{p - p_{wf}}$$

the theoretically calculated oil productivity index at any time is obtained from the ratio formula of $J_o$ to $J_{oi}$;

$$J_o = \frac{\mu_{oi} B_{oi} e^{[-\beta(p_i - p)]} (1 - f_w)}{\mu_o B_o} J_{oi}$$

at this time, the optimal objective function is established:

$$M = \min \sum_{i=1}^{n} (J_o^* - J_o)^2.$$

\* \* \* \* \*